US009659347B2

(12) United States Patent
Sun et al.

(10) Patent No.: US 9,659,347 B2
(45) Date of Patent: May 23, 2017

(54) METHOD AND DEVICE FOR IMAGE ZOOM OUT PROCESSING

(71) Applicant: MStar Semiconductor, Inc., Hsinchu Hsien (TW)

(72) Inventors: Guo-Liang Sun, Shanghai (CN); Xuan-Cheng Zhu, Shanghai (CN)

(73) Assignee: MStar Semiconductor, Inc., Hsinchu Hsien (TW)

( * ) Notice: Subject to any disclaimer, the term of this patent is extended or adjusted under 35 U.S.C. 154(b) by 159 days.

(21) Appl. No.: 14/584,002

(22) Filed: Dec. 29, 2014

(65) Prior Publication Data
US 2015/0187049 A1 Jul. 2, 2015

(30) Foreign Application Priority Data

Dec. 31, 2013 (CN) .......................... 2013 1 0754076

(51) Int. Cl.
*G06T 3/40* (2006.01)
*G06T 17/05* (2011.01)
(Continued)

(52) U.S. Cl.
CPC ............ *G06T 3/4007* (2013.01); *G06T 17/05* (2013.01); *H04N 5/365* (2013.01); *G06F 3/017* (2013.01);
(Continued)

(58) Field of Classification Search
CPC ....... G06T 17/05; G06T 3/4053; H04N 5/365; G06F 2203/04806; G06F 3/0481;
(Continued)

(56) References Cited

U.S. PATENT DOCUMENTS

| 8,243,102 | B1* | 8/2012 | Cornell | .................. G06T 17/05 |
| | | | | 345/418 |
| 8,824,794 | B1* | 9/2014 | Nash | ..................... G06T 3/4053 |
| | | | | 382/167 |
| 2013/0321671 | A1* | 12/2013 | Cote | ...................... H04N 5/365 |
| | | | | 348/241 |

FOREIGN PATENT DOCUMENTS

| TW | 201246124 A1 | 11/2012 |
| TW | 201338509 A | 9/2013 |

OTHER PUBLICATIONS

TIPO Office Action, Jan. 21, 2016, 5 pages.

* cited by examiner

*Primary Examiner* — Devona Faulk
*Assistant Examiner* — Kevin Wu
(74) *Attorney, Agent, or Firm* — Edell, Shapiro & Finnan, LLC

(57) ABSTRACT

A method for image zoom out processing includes: determining whether a predetermined zoom out ratio is smaller than a first predetermined threshold; when the predetermined zoom out ratio is smaller than the first predetermined threshold, performing a zoom out process on an image according to the first predetermined threshold by a bilinear interpolation algorithm to obtain a zoomed out image; determining whether a product of a resolution of the zoomed out image and the first predetermined threshold is greater than or equal to a target resolution; when the product is greater than the target resolution, repeating the step of performing the zoom out process; when the product is smaller than the target resolution, performing the zoom out process on the image according to a second predetermined threshold by the bilinear interpolation algorithm so that the resolution of the zoomed out image reaches the target resolution.

10 Claims, 3 Drawing Sheets

(51) Int. Cl.
  *G06F 3/14* (2006.01)
  *H04N 5/365* (2011.01)
  *G06F 3/0488* (2013.01)
  *G06F 3/01* (2006.01)
  *G06F 3/0481* (2013.01)

(52) U.S. Cl.
  CPC ........ *G06F 3/0481* (2013.01); *G06F 3/04883* (2013.01); *G06F 3/14* (2013.01); *G06F 2203/04806* (2013.01); *G06T 3/4053* (2013.01)

(58) Field of Classification Search
  CPC .... G06F 3/017; G06F 3/04883; G06F 3/0484; G06F 3/14; G06F 3/0346; G06F 17/24; G06F 3/041; G06F 3/0488; G06F 17/30241; G06F 2203/04808; G06F 3/00
  See application file for complete search history.

METHOD AND DEVICE FOR IMAGE ZOOM OUT PROCESSING

This application claims the benefit of People's Republic of China application Serial No. 201310754076.9, filed Dec. 31, 2013, the subject matter of which is incorporated herein by reference.

BACKGROUND OF THE INVENTION

Field of the Invention

The invention relates in general to an image processing technology, and more particularly to a method and device for image zoom out processing.

Description of the Related Art

Current methods for image zoom out processing generally directly zoom out an original image to a target image according to a zoom out ratio by a bilinear interpolation algorithm. When the above approach is adopted for an image that needs to be greatly zoomed out, many pixels in the original image are directly omitted. As such, aliases may appear at edges of the zoomed out image, leading to significant degradation in the display accuracy of the image.

For example, assume that the resolution of an original image is 480*640, and the resolution of a target image after a zoom out process is 96*128. In the zoom out process, the value of a pixel in the target image calculated by the bilinear interpolation algorithm is obtained through calculating values of four pixels adjacent to the pixel in the original image. When 480 pixels in an original row are reduced to 96 pixels in a zoomed out row, the 96 pixels of the zoomed out row only involve a maximum of 192 pixels of the original row, while the remaining 288 pixels are omitted. Thus, aliases may appear at edges of the zoomed out image, leading to significant degradation in the display accuracy of the image.

SUMMARY OF THE INVENTION

The invention is directed to a method and device for image zoom out processing for mitigating aliases at edges of a zoomed out image and enhancing display accuracy of the image.

According to an aspect of the present invention, a method for image zoom out processing is provided. The method includes: determining whether a predetermined zoom out ratio is smaller than a first predetermined threshold, wherein the predetermined zoom out ratio is a ratio of an original resolution of an image to a target resolution, and the original resolution is greater than the target resolution; when the predetermined zoom out ratio is smaller than the first predetermined threshold, performing a zoom out process on the image according to the first predetermined threshold by a bilinear interpolation algorithm to obtain a zoomed out image; determining whether a product of a resolution of the zoomed out image and the first predetermined threshold is greater than or equal to the target resolution; when the product is greater than or equal to the target resolution, continuing the step of performing the zoom out process on the image according to the first predetermined threshold by the bilinear interpolation algorithm to obtain the zoomed out image; and when the product is smaller than the target resolution, performing the zoom out process on the image according to a second predetermined threshold by the bilinear interpolation algorithm so that the resolution of the zoomed out image reaches the target resolution.

According to another aspect of the present invention, a device for image zoom out processing is provided. The device includes an iterator and a bilinear accelerator. The iterator determines whether a predetermined zoom out ratio is smaller than a first predetermined threshold. The predetermined zoom out ratio is a ratio of an original resolution of an image to a target resolution, and the original resolution is greater than the target resolution. When the iterator determines that the predetermined zoom out ratio is smaller than the first predetermined threshold, the bilinear accelerator performs a zoom out process on the image according to the first predetermined threshold by a bilinear interpolation algorithm to obtain a zoomed out image. The iterator further determines whether a product of a resolution of the zoomed output image and the first predetermined threshold is greater than or equal to the target resolution. When the iterator determines that the product is greater than or equal to the target resolution, the bilinear accelerator continues performing the zoom out process on the image according to the first predetermined threshold by the bilinear interpolation algorithm to obtain the zoomed out image. When the iterator determines that the product is smaller than the target resolution, the bilinear accelerator performs the zoom out process on the image according to a second predetermined threshold by the bilinear interpolation algorithm, so that the resolution of the zoomed out image reaches the target resolution.

The present invention provides following effects compared to known technologies. In the present invention, it is determined whether a predetermined zoom out ratio is smaller than a first predetermined threshold. When the predetermined zoom out ratio is smaller than the first predetermined threshold, a zoom output process is performed on an image according to the first predetermined threshold by a bilinear interpolation algorithm to obtain a zoomed out image. It is then determined whether a product of a resolution of the zoomed out image and the first predetermined threshold is greater than or equal to a target resolution. When the product is greater than or equal to the target resolution, the step of performing the zoom out process on the image according to the first predetermined threshold by the bilinear interpolation algorithm to obtain the zoomed out image is continued. When the product is smaller than the target resolution, the zoom out process is performed on the image according to a second predetermined threshold by the bilinear interpolation algorithm, so that the resolution of the zoomed out image reaches the target resolution. With the above method, the present invention mitigates the aliases at edges of the zoomed out image and enhances the display accuracy of the image.

The above and other aspects of the invention will become better understood with regard to the following detailed description of the preferred but non-limiting embodiments. The following description is made with reference to the accompanying drawings.

DETAILED DESCRIPTION OF THE INVENTION

Throughout the specification and the appended claims, certain terms are utilized to refer to specific elements. A person having ordinary skill in the art can easily appreciate that, manufacturers may use different terms to refer to a same element. It should be noted that, the elements described in the specification and the appended claims are not distinguished by these different terms, and are rather differentiated based on functional differences. Embodiments of the present invention are described in detail with the accompanying drawings below.

Figure 1:
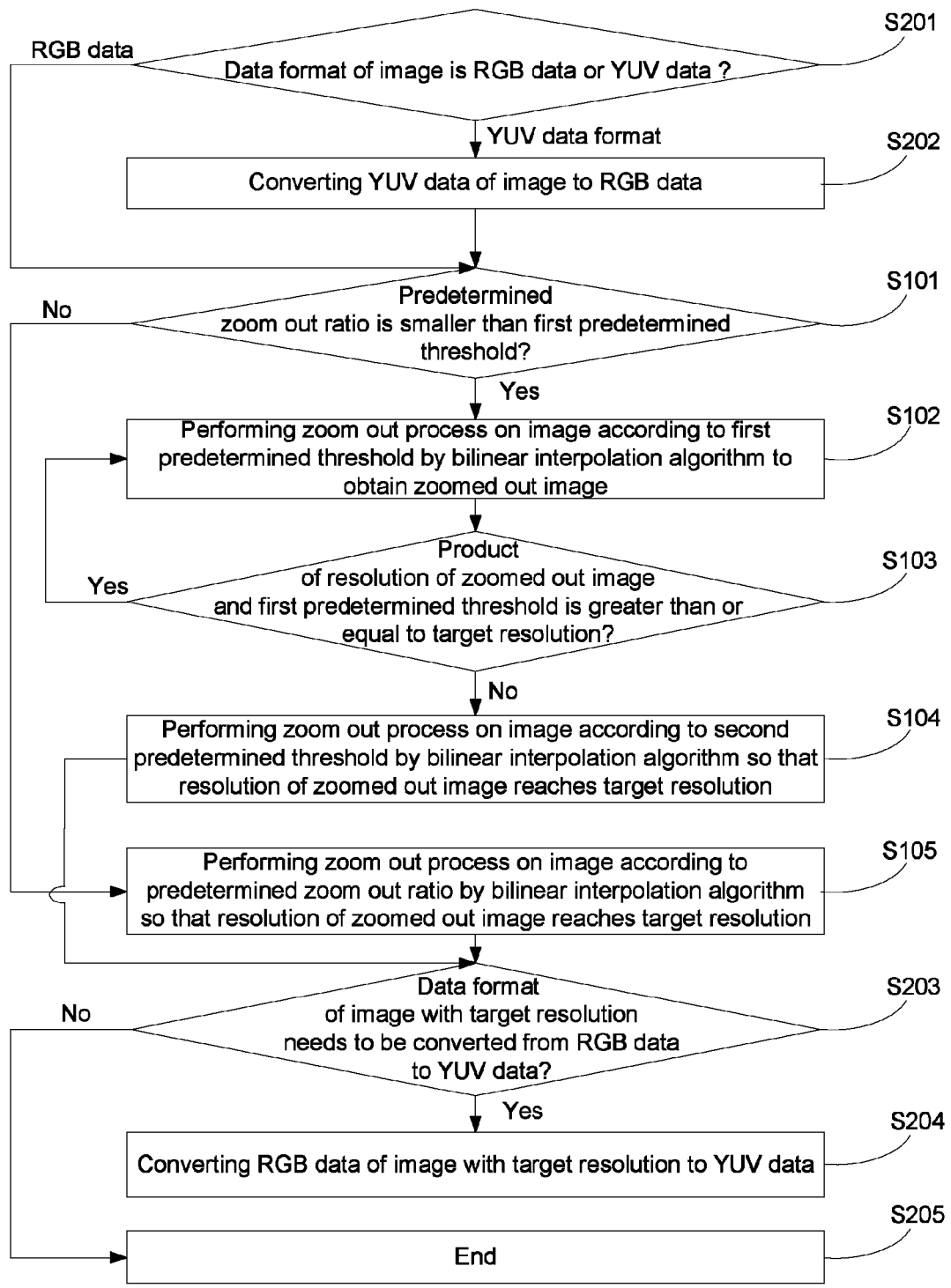
FIG. 1 is a flowchart of a method for image zoom out processing according to a first embodiment of the present invention.

FIG. 1 shows a flowchart of a method for image zoom out processing according to a first embodiment of the present invention. It should be noted that, given that substantially same effects are obtained, the method of the present invention is not limited to the process sequence shown in FIG. 1. Referring to FIG. 1, the method includes following steps.

In step S101, it is determined whether a zoom out ratio is smaller than a first predetermined threshold. When the predetermined zoom out ratio is smaller than the first predetermined threshold, step S102 is performed; when the predetermined zoom out ratio is greater than or equal to the first predetermined threshold, step S105 is performed.

In step S101, the first predetermined threshold is a value smaller than 1. The predetermined zoom out ratio is a ratio of an original resolution of an image to a target resolution, and the original resolution is greater than the target resolution. For example, assume that the first predetermined threshold is 1/4, the original resolution of the image is 480*640, and the target resolution after the zoom out process is 96*128. Thus, by calculating the ratio of the original resolution to the target resolution, it is obtained that the predetermined zoom out ratio is 1/25, which is smaller than the first predetermined threshold 1/4.

From another perspective, the resolution may be represented by a product of a pixel count in the horizontal direction (i.e., the number of pixels in one row) and a pixel count in the vertical direction (i.e., the number of pixels in one column), and the predetermined zoom out ratio may be defined as a ratio of the pixel count of an original row to the pixel count of a target row, or a ratio of the pixel count an original column to the pixel count of a target column. In continuation of the above example, by calculating the ratio of the pixel count of an original row to the pixel count of a target row or the ratio of the pixel count of an original column to the pixel count a target column, it can be obtained that the predetermined zoom out ratio is 1/5, which is a square root of the above-defined predetermined zoom out ratio. Correspondingly, the first predetermined threshold is preferably a value of the square root of the above-defined first predetermined threshold, i.e., 1/2.

In step S102, a zoom out process is performed on an image according to the first predetermined threshold by a bilinear interpolation algorithm to obtain a zoomed out image.

In step S102, a zoom out process is performed on an image according to a zoom out ratio of the first predetermined threshold by a bilinear interpolation algorithm to obtain a zoomed out image, wherein a data format of the image is based on RGB data. More specifically, take an example where the first predetermined threshold is 1/4, and the resolution of the image is 6*4. By performing a zoom out process according to a zoom out ratio of 1/4, the 6 row pixels in the image with a 6*4 resolution are reduced to 1/2, i.e., reduced to 3 row pixels, and the 4 column pixels are reduced to 1/2, i.e., reduced to 2 column pixels. In the zoomed out image, the RGB data corresponding to the 3*2 pixels is obtained from calculating the RGB data corresponding to 6*4 pixels. In the calculation process, the 6*4 pixels are taken into account. That is to say, without omitting any of the pixels, all of the RGB data corresponding to the 6*4 pixels contributes to the 3*2 pixels in the zoomed out image.

In continuation of the above example, after performing step S102 for the first time, i.e., after zooming out the image in the original resolution of 480*640 according to the zoom out ratio of 1/4 by the bilinear interpolation algorithm, an image in a 240*320 resolution is obtained.

After performing step S102 for the second time, i.e., after again zooming out the image in the original resolution of 240*320 according to the zoom out ratio of 1/4 by the bilinear interpolation algorithm, an image in a 120*160 resolution is obtained.

In the embodiment, the maximum number of performing step S102 may be calculated according to an equation below:

$m_{max} = \lceil \log_N X \rceil - 1$, where N is the first predetermined threshold, X is the predetermined zoom out ratio, and $\lceil\ \rceil$ is a rounding up operation.

In continuation of the above example, by substituting the predetermined zoom out ratio 1/25 and the first predetermined threshold 1/4 into the above equation, it is obtained that the maximum number $m_{max}$ of performing step S102 is 2 times.

One person skilled in the art can understand that, in the zoom out operation each time step S102 is performed, the resolution of the image reduces by an integral multiple of the first predetermined threshold. In the zoom out process, the bilinear interpolation algorithm utilizes the value of each pixel in the image before zooming out to obtain the value of the corresponding pixel in the zoomed out image, thereby effectively mitigating the aliases at edges of the zoomed out image. Further, after iterating the zoom out operation of step S102 for an $m_{max}$ number of times, the resolution of the zoomed out image becomes close to the target image. At this point, by again performing the zoom out operation of step S102, the resolution of the image becomes smaller than the target image.

In step S103, it is determined whether a product of a resolution of the zoomed out image and the first predetermined threshold is greater than or equal to the target resolution. Step S102 is continued when the product is greater than or equal to the target resolution, or else step S104 is performed when the product is smaller than the target resolution.

In the embodiment, in continuation of the above example, an image with a resolution of 240*320 is obtained after performing step S102 for the first time, and the resolution is multiplied by the first predetermined threshold, i.e., 1/4, hence obtaining a product of 120*160. This product is greater than the target resolution 96*128, and so step S102 is continued.

After performing step S102 for the second time, an image with a resolution of 120*160 is obtained. The resolution is multiplied by the first predetermined threshold, i.e., 1/4, to obtain a product of 60*80. This product is smaller than the target resolution 96*128, and so step S104 is performed.

In step S104, a zoom out process is performed on the image according to a second predetermined threshold by the bilinear interpolation algorithm, so that the resolution of the zoomed out image reaches the target resolution.

In step S104, the second predetermined threshold is calculated according to an equation below:

$N^{\lceil \log_N X \rceil - 1} * M = X$, where N is the first predetermined threshold, M is the second predetermined threshold, X is the predetermined zoom out ratio, and $\lceil \ \rceil$ is a rounding up operation.

In continuation of the above example, by substituting the predetermined zoom out ratio 1/25 and the first predetermined threshold 1/4 into the above equation, it is obtained that the second predetermined threshold equals 16/25.

Next, the zoom out process is performed on the image with a resolution of 120*160 according to the zoom out ratio of 16/25 by the bilinear interpolation algorithm to obtain the target image in a 96*128 resolution.

More specifically, by performing a zoom out process according a zoom out ratio of 16/25, the 120 row pixels in the 120*160 image are reduced to 4/5, i.e., to 96 pixels, and 160 column pixels are reduced to 4/5, i.e., to 128 column pixels.

In step S105, the zoom out process is performed on the image according to the predetermined zoom out ratio by the bilinear interpolation algorithm, so that the resolution of the zoomed out image reaches the target resolution.

In step S105, when step S101 determines that the predetermined zoom out ratio is greater than or equal to the first predetermined threshold, the zoom out process is performed on the image by the predetermined zoom out ratio by the bilinear interpolation algorithm.

For example, assume that the first predetermined threshold is 1/4 the original resolution of the image is 120*160, and the target resolution after the zoom out process is 96*128. Thus, by calculating the ratio of the original resolution to the target resolution, it is obtained that the predetermined zoom out ratio is 16/25, which is greater than the first predetermined threshold. At this point, by performing the zoom out process on the image with a 120*160 resolution according to the zoom out ratio of 16/25 by the bilinear interpolation algorithm, a target image with a 96*128 resolution is obtained.

In the first embodiment of the present invention, it is first determined whether the zoom out ratio is smaller than the first predetermined threshold. When the predetermined zoom out ratio is smaller than the first predetermined threshold, the image is processed in iteration so that the resolution of the zoomed out image reaches the target resolution. By the above approach, the present invention is capable of mitigating the aliases at edges of a zoomed out image and thus enhancing display accuracy of the image.

Figure 2:
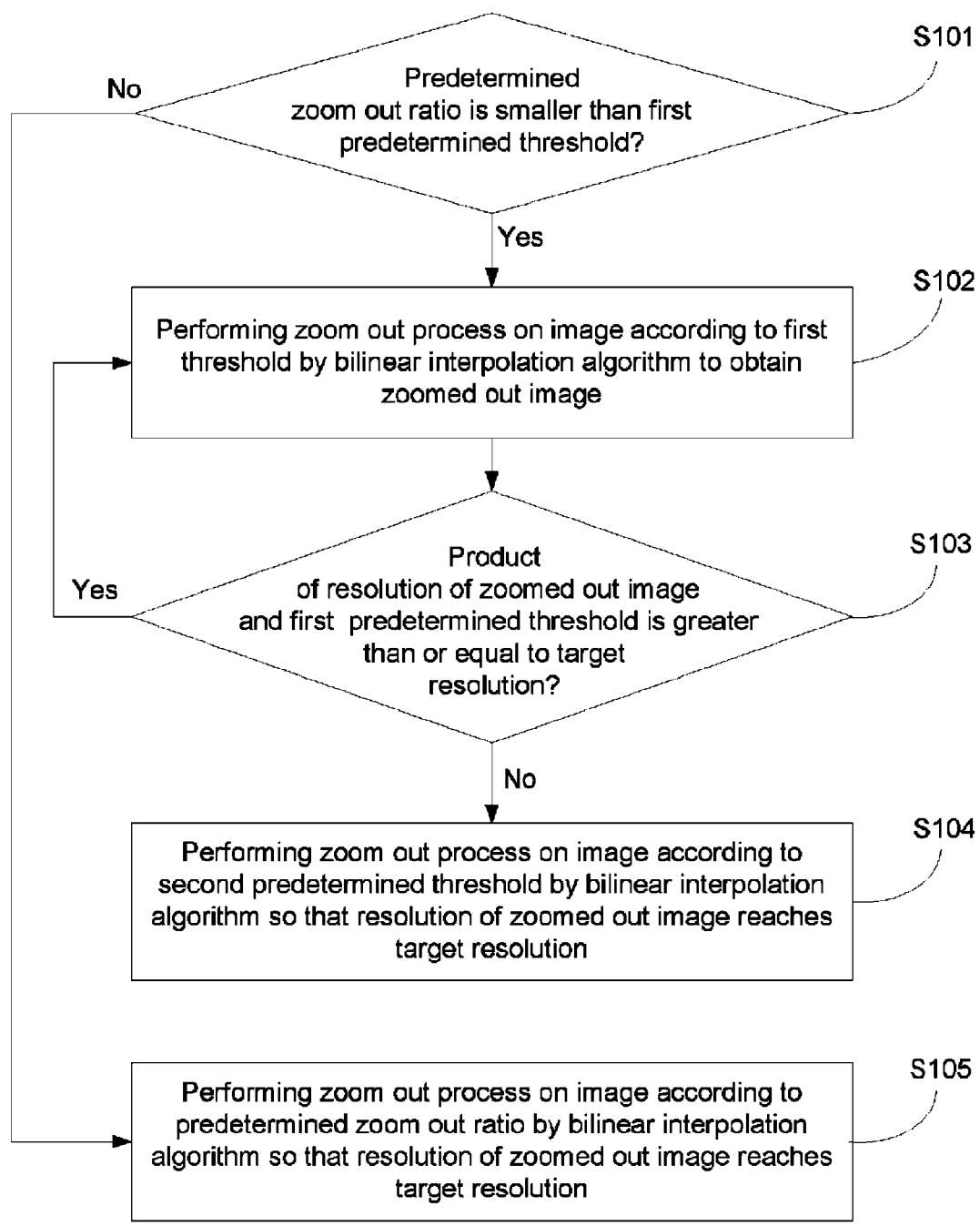
FIG. 2 is a flowchart of a method for image zoom out processing according to a second embodiment of the present invention.

FIG. 2 shows a flowchart of a method for image zoom out processing according to a second embodiment of the present invention. It should be noted that, given substantially same results are obtained, the method of the present invention is not limited to be performed in the sequence in FIG. 2. Referring to FIG. 2, the method includes following steps.

As shown in FIG. 2, main differences of the embodiment in FIG. 2 from that in FIG. 1 are that, before step S102, the method in FIG. 2 further includes steps S201 and S202. Further, after step S105, the method in FIG. 2 further includes steps S203 and S204. Details of step S201, S202, S203 and S204 are given as follows.

In step S201, it is determined whether a data format of the image is RGB data or YUV data. Step S202 is performed when the image is in YUV data, and step S101 is performed when the image is in RGB data.

In step S201, the image may be described in a data format of RGB data or YUV data. When the image is described by RGB data, the RGB data of each pixel in the image may be directly zoom out processed by the bilinear interpolation algorithm. When the image is described by YUV data, the YUV data of each pixel in the image needs to be first converted to RGB data, and the RGB data of each pixel in the image is then zoom out processed by the bilinear interpolation algorithm.

In step S202, the YUV data in the image is converted to RGB data.

In step S202, the YUV data corresponding to each pixel is converted to RGB data by an equation below:

$$\begin{cases} R = \text{floor}(Y + V + V/8), & R \in [0, 255] \\ G = Y - \text{floor}(U/2) + \text{floor}(U/8) - \\ \quad \text{floor}(V/16) - \text{floor}(v/2), & G \in [0, 255] \\ B = Y + 2U, & B \in [0, 255] \end{cases}$$

where floor is a rounding down operation.

In the above process of converting YUV data to RGB data by a hardware circuit, the division in the above equation is limited to denominators of 2, 8 or 16. At this point, the division may also be implemented by a shifting operation to significantly increase the speed for zoom out processing the image.

In step S203, it is determined whether the data format of the image with the target resolution needs to be converted from RGB data to YUV data. Step S204 is performed if so, or else the process ends in step S205 if not.

In step S203, after having performed step S104 or S105 in FIG. 1, it is further determined whether the data format in the image with the target resolution needs to be converted from RGB data to YUV data. That is to say, the zoomed out image in the second embodiment of the present invention may be described by a data format of RGB data or YUV data, so that the zoomed out image may be conveniently utilized for different applications.

In step S204, the RGB data of the image with the target resolution is converted to YUV data.

In step S204, the RGB data corresponding each pixel in the image with the target resolution is converted to YUV data by an equation below:

$$\begin{cases} Y = \text{floor}(R/4 + R/32 + R/64 + R/256 + \\ \quad G/2 + G/16 + G/64 + G/128 + \\ \quad B/16 + B/32 + B/64 + B/256), & Y \in [0, 255] \\ U = \text{floor}(-R/8 - R/64 - R/128 - G/4 - \\ \quad G/32 - G/128 + B/2 + B/16), & U \in [-127, 128] \\ V = \text{floor}(R/2 + R/8 - R/128 - R/256 - \\ \quad G/2 - G/64 + B/8 + B/64 + B/128), & V \in [-127, 128] \end{cases}$$

where floor is a rounding down operation.

In the above process of converting the RGB data to the YUV data by a hardware circuit, the division in the above equation is limited to denominators of $2^n$, where n is a positive integer. At this point, the division may be implemented by a shifting operation to significantly increase the speed for processing the image.

In the second embodiment of the present invention, when the data of the image before zooming out is YUV data, the YUV data of the image is converted to RGB data. Further, when the data of the zoomed out image needs to be converted to YUV data, the RGB data of the zoomed out image is converted to YUV data. Thus, zoom out processing for two different data formats can be realized to satisfy actual application requirements. Further, in the second embodiment of the present invention, it is determined whether the predetermined zoom out ratio is smaller than the first predetermined threshold. When the zoom out ratio is smaller than the first predetermined threshold, the image is zoom out processed in iteration, so as to mitigate the aliases at edges of the image and enhance the display accuracy of the image.

Figure 3:
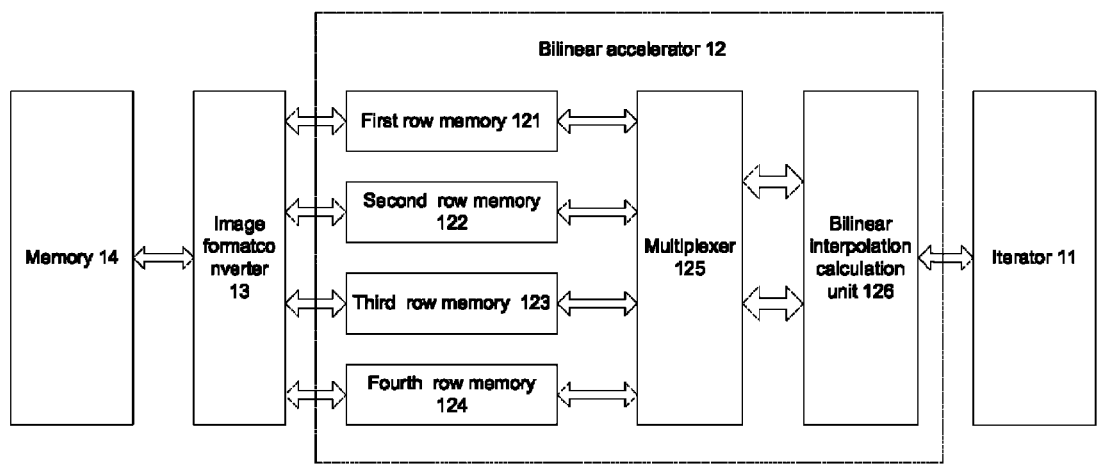
FIG. 3 is a schematic diagram of a device for image zoom out processing according to an embodiment of the present invention.

FIG. 3 shows a schematic diagram of a device for image zoom out processing according to an embodiment of the present invention. As shown in FIG. 3, the device includes an iterator 11, a bilinear accelerator 12, an image format converter 13 and a memory 14.

More specifically, the iterator 11 determines whether a predetermined zoom out ratio is smaller than a first predetermined threshold. The predetermined zoom out ratio is a ratio of an original resolution of an image to a target resolution, wherein the original resolution is greater than the target resolution. Preferably, the first predetermined threshold is 1/4.

When the iterator 11 determines that the predetermined zoom out ratio is smaller than the first predetermined threshold, the bilinear accelerator 12 performs a zoom out process on the image according to the first predetermined threshold by a bilinear interpolation algorithm to obtain a zoomed out image. Values of pixels in the image are stored in the memory 14. After the bilinear accelerator 12 completes the zoom out operation, the iterator 11 determines whether a product of a resolution of the zoomed out image and the first predetermined threshold is greater than or equal to the target resolution. When the iterator 11 determines that the product is greater than the target resolution, the bilinear accelerator 12 continues of operation of performing the zoom out process on the image according to the first predetermined threshold by the bilinear interpolation algorithm to obtain the zoomed out image. After the bilinear accelerator 12 completes the zoom out operation, the iterator 11 continues of the operation of determining whether the product of the resolution of the zoomed out image and the first predetermined threshold is greater than or equal to the target resolution. The above operations are iterated until the iterator 11 determines that the product of the resolution of the zoomed out image and the first predetermined threshold is smaller than the target resolution. At this point, the bilinear accelerator 12 performs the zoom out process on the image according to a second predetermined threshold by the bilinear interpolation algorithm, so that the resolution of the zoomed out image reaches the target resolution.

The second predetermined threshold is calculated according to an equation below:

$N^{\lceil log_N X \rceil - 1} *M=X$, where N is the first predetermined threshold, M is the second predetermined threshold, X is the predetermined zoom out ratio, and $\lceil \ \rceil$ is a rounding up operation.

When the iterator 11 determines that the predetermined zoom out ratio is greater than or equal to the first predetermined threshold, the bilinear accelerator 12 performs the zoom out process on the image according to the predetermined zoom out ratio by the bilinear interpolation algorithm, so that the resolution of the zoomed out image reaches the target resolution.

More specifically, the bilinear accelerator 12 includes a first row memory 121, a second row memory 122, a third row memory 123, a fourth row memory 124, a multiplexer 125, and a bilinear interpolation calculation unit 126.

The first row memory 121, the second row memory 122, the third row memory 123 and the fourth row memory 124 obtain data of four adjacent rows of pixels in the image in a time division manner.

The multiplexer 125 is connected to the first row memory 121, the second row memory 122, the third row memory 123, the fourth row memory 124 and the bilinear interpolation calculation unit 126. Under the control of the bilinear interpolation calculation unit 126, the multiplexer 125 selects either the first row memory 121 and the second row memory 122 or the third row memory 123 and the fourth row memory 124 to be connected to the bilinear interpolation calculation unit 126.

The bilinear interpolation calculation unit 126 obtains data of pixels of two rows stored in the two row memories connected, and performs a zoom out process on the pixels of the two rows by a bilinear interpolation algorithm.

While the bilinear interpolation calculation unit 126 obtains the data of the pixels of the two rows stored in the two row memories connected, and performs the zoom out process on the data of the two rows by the bilinear interpolation algorithm, the other two row memories obtain the data of the pixels of the next two lines of the image.

Assume that the first predetermined threshold is 1/4, and the image has a resolution of 480*640. The bilinear accelerator 12 performs a zoom out process on the image according to the first predetermined threshold by the bilinear interpolation algorithm to obtain a zoomed out image. More specifically, in the above process, the first row memory 121 and the second row memory 122 obtain the data of the first-row pixels and the second-row pixels in the 480*640 image from the memory 14 via a memory read/write bus. The data of the pixels of each row includes data of 640 pixels, and the data format of the pixels adopts RGB data.

After the first row memory 121 and the second row memory 122 complete reading the data, the bilinear accelerator 12 controls the multiplexer 125 to connect the first row memory 121 and the second row memory 122 to the bilinear interpolation calculation unit 126. As such, the bilinear interpolation calculation unit 126 reads the data of the first-row pixels and the second-row pixels in the first row memory 121 and the second row memory 122, reduces the data of the first-row pixels and the second-row pixels to data of one first row consisted of 320 pixels, and writes the data of the first row consisted of 320 pixels to the first row memory 121 or the second row memory 122. Meanwhile, the third row memory 123 and the fourth row memory 124 obtain the data of the third-row pixels and fourth-row pixels in the image with a 480*640 resolution from the memory 14 via the memory read/write bus.

After the third row memory 123 and the fourth row memory 124 complete reading the data, the bilinear accelerator 12 controls the multiplexer 125 to connect the third row memory 123 and the fourth row memory 124 to the bilinear interpolation calculation unit 126. As such, the bilinear interpolation calculation unit 126 reads the data of the third-row pixels and the fourth-row pixels in the third row memory 123 and the fourth row memory 124, reduces the data of the third-row pixels and the fourth-row pixels to data of one second row consisted of 320 pixels, and writes the data of the second row consisted of 320 pixels to the third row memory 123 or the fourth row memory 124. Meanwhile, the data of the first row consisted of 320 pixels obtained from the zoom out process and stored in the first row memory 121 or the second memory 122 is written into the memory 14 via the memory read/write bus, and the data of the fifth-row pixels and sixth-row pixels in the 480*640 image is obtained from the memory 14 via the memory read/write bus.

The above operations are iterated until the data of the $240^{th}$ row consisted of 320 pixels from zoom out processing the data of the 479$^{th}$-row pixels and 480$^{th}$-row pixels is obtained and stored into the memory 14 via the memory write/read bus. At this point, the image stored in the memory 14 is an image with a 240*320 resolution.

The image format converter 13 is connected to the bilinear accelerator 12 and the memory 14. Before the bilinear accelerator 12 performs the zoom out process on the image, if the data format of the image stored in the memory 14 is YUV data, the image format converter 13 converts the YUV data of the image stored in the memory 14 to RGB data and transmits the RGB data to the bilinear accelerator 12 according to an equation below:

$$\begin{cases} R = \text{floor}(Y + V + V/8), & R \in [0, 255] \\ G = Y - \text{floor}(U/2) + \text{floor}(U/8) - \\ \quad \text{floor}(V/16) - \text{floor}(v/2), & G \in [0, 255], \\ B = Y + 2U, & B \in [0, 255] \end{cases}$$

where floor is a rounding down operation.

Further, after the bilinear accelerator 12 performs the zoom out process on the image and target resolution is reached, if the data format of the image needs to be converted from RGB data to YUV data, the image format converter 13 further converts the RGB data of the image to YUV data according to a following equation and stores the YUV data to the memory 14:

$$\begin{cases} Y = \text{floor}(R/4 + R/32 + R/64 + R/256 + \\ \quad G/2 + G/16 + G/64 + G/128 + & Y \in [0, 255] \\ \quad B/16 + B/32 + B/64 + B/256), \\ U = \text{floor}(-R/8 - R/64 - R/128 - G/4 - \\ \quad G/32 - G/128 + B/2 + B/16), & U \in [-127, 128] \\ V = \text{floor}(R/2 + R/8 - R/128 - R/256 - \\ \quad G/2 - G/64 + B/8 + B/64 + B/128), & V \in [-127, 128] \end{cases}$$

where floor is a rounding down operation.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for image zoom out processing, comprising:
determining whether a predetermined zoom out ratio is smaller than a first predetermined threshold, wherein the predetermined zoom out ratio is a ratio of an original resolution of an image to a target resolution, and the original resolution is greater than the target resolution;
when the predetermined zoom out ratio is smaller than the first predetermined threshold, performing a zoom out process on the image according to the first predetermined threshold by a bilinear interpolation algorithm to obtain a zoomed out image;
determining whether a product of a resolution of the zoomed out image and the first predetermined threshold is greater than or equal to the target resolution;
when the product is greater than or equal to the target resolution, continuing the step of performing the zoom out process on the image according to the first predetermined threshold by the bilinear interpolation algorithm to obtain the zoomed out image; and
when the product is smaller than the target resolution, performing the zoom out process on the image according to a second predetermined threshold, so that the resolution of the zoomed out image reaches the target resolution,
wherein the second predetermined threshold is calculated according to an equation:
$N^{\lceil \log_N X \rceil - 1} * M = X$, where N is the first predetermined threshold, M is the second predetermined threshold, X is the predetermined zoom out ratio, and ⌈ ⌉ is a rounding up operation.

2. The method according to claim 1, further comprising:
when the predetermined zoom out ratio is greater than or equal to the first predetermined threshold, performing the zoom out process on the image according to the predetermined zoom out ratio by the bilinear interpolation algorithm, so that the resolution of the zoomed out image reaches the target resolution.

3. The method according to claim 1, before the step of determining whether the predetermined zoom out ratio is smaller than the first predetermined threshold, the method comprising:
determining whether a data format of the image is RGB data or YUV data;
when the data format of the image is the YUV data, converting the YUV data to the RGB data according to an equation:

$$\begin{cases} R = \text{floor}(Y + V + V/8), & R \in [0, 255] \\ G = Y - \text{floor}(U/2) + \text{floor}(U/8) - \\ \quad \text{floor}(V/16) - \text{floor}(v/2), & G \in [0, 255], \\ B = Y + 2U, & B \in [0, 255] \end{cases}$$

where floor is a rounding down operation.

4. The method according to claim 3, further comprising:
determining whether the data format of the image with the target resolution needs to be converted from the RGB data to the YUV data;
when the RGB data needs to be converted to the YUV data, converting the RGB data to the YUV data according to an equation:

$$\begin{cases} Y = \text{floor}(R/4 + R/32 + R/64 + R/256 + \\ \quad G/2 + G/16 + G/64 + G/128 + & Y \in [0, 255] \\ \quad B/16 + B/32 + B/64 + B/256), \\ U = \text{floor}(-R/8 - R/64 - R/128 - G/4 - \\ \quad G/32 - G/128 + B/2 + B/16), & U \in [-127, 128] \\ V = \text{floor}(R/2 + R/8 - R/128 - R/256 - \\ \quad G/2 - G/64 + B/8 + B/64 + B/128), & V \in [-127, 128] \end{cases}$$

where floor is a rounding down operation.

5. The method according to claim 1, wherein the second predetermined threshold is calculated according to an equation:
$N^{\lceil \log_N X \rceil - 1} * M = X$, where N is the first predetermined threshold, M is the second predetermined threshold, X is the predetermined zoom out ratio, and ⌈ ⌉ is a rounding up operation.

6. The method according to claim 1, wherein the predetermined first predetermined threshold is 1/4.

7. A device for image zoom out processing, comprising an iterator and a bilinear accelerator, wherein:
the iterator determines whether a predetermined zoom out ratio is smaller than a first predetermined threshold, wherein the predetermined zoom out ratio is a ratio of an original resolution of an image to a target resolution, and the original resolution is greater than the target resolution;
when the iterator determines that the predetermined zoom out ratio is smaller than the first predetermined threshold, the bilinear accelerator performs a zoom out process on the image according to the first predetermined threshold by a bilinear interpolation algorithm to obtain a zoomed out image;
the iterator determines whether a product of a resolution of the zoomed out image and the first predetermined threshold is greater than or equal to the target resolution;
when the iterator determines that the product is greater than or equal to the target resolution, the bilinear accelerator continues the operation of performing the zoom out process on the image according to the first predetermined threshold by the bilinear interpolation algorithm to obtain the zoomed out image; and
when the iterator determines that the product is smaller than the target resolution, the bilinear accelerator performs the zoom out operation on the image according to a second predetermined threshold, so that the resolution of the image reaches the target resolution,
wherein the second predetermined threshold is calculated according to an equation:
$N^{\lceil \log_N X \rceil - 1} * M = X$, where N is the first predetermined threshold, M is the second predetermined threshold, X is the predetermined zoom out ratio, and $\lceil \ \rceil$ is a rounding up operation.

8. The device according to claim 7, wherein when the iterator determines that the predetermined zoom out ratio is greater than or equal to the first predetermined threshold, the bilinear accelerator performs the zoom out process on the image according to the predetermined zoom out ratio by the bilinear interpolation algorithm, so that the resolution of the zoomed out image reaches the target resolution.

9. The device according to claim 7, further comprising an image format converter; wherein:
before the bilinear accelerator performs the zoom out process on the image, if a data format of image is YUV data, the image format converter converts the YUV data of the image to RGB data according to an equation:

$$\begin{cases} R = \text{floor}(Y + V + V/8), & R \in [0, 255] \\ G = Y - \text{floor}(U/2) + \text{floor}(U/8) - \\ \quad \text{floor}(V/16) - \text{floor}(v/2), & G \in [0, 255], \\ B = Y + 2U, & B \in [0, 255] \end{cases}$$

where floor is a rounding down operation; and
after the bilinear accelerator performs the zoom out process on the image and the target resolution is reached, if the data format of the image needs to be converted from the RGB data to the YUV data, the image format converter converts the RGB data of the image to the YUV data according to an equation:

$$\begin{cases} Y = \text{floor}(R/4 + R/32 + R/64 + R/256 + \\ \quad G/2 + G/16 + G/64 + G/128 + & Y \in [0, 255] \\ \quad B/16 + B/32 + B/64 + B/256), \\ U = \text{floor}(-R/8 - R/64 - R/128 - G/4 - \\ \quad G/32 - G/128 + B/2 + B/16), & U \in [-127, 128], \\ V = \text{floor}(R/2 + R/8 - R/128 - R/256 - \\ \quad G/2 - G/64 + B/8 + B/64 + B/128), & V \in [-127, 128] \end{cases}$$

where floor is a rounding down operation.

10. The device according to claim 7, wherein:
the bilinear accelerator comprises a first row memory, a second row memory, a third row memory, a fourth row memory, a multiplexer and a bilinear interpolation calculation unit;
the first row memory, the second row memory, the third row memory and the fourth row memory obtain data of pixels of four adjacent rows in the image in a time division manner;
the multiplexer selects either the first row memory and the second row memory or the third row memory and the fourth row memory to be connected to the bilinear interpolation calculation unit;
the bilinear interpolation calculation unit obtains the data of the pixels of two rows stored in the two row memories connected to the bilinear interpolation calculation unit, and performs the zoom out process on the data of the pixels of the two rows; and
while the bilinear interpolation calculation unit obtains the data of the pixels of two rows stored in the two row memories connected to the bilinear interpolation calculation unit, and performs the zoom out process on the data of the pixels of the two rows, the other two row memories obtain the data of the pixels of next two adjacent rows in the image.

* * * * *